US011882811B1

(12) United States Patent
Libsack (10) Patent No.: US 11,882,811 B1
(45) Date of Patent: Jan. 30, 2024

(54) AUTOMATED LIVESTOCK FEEDER

(71) Applicant: HayBox LLC, Greeley, CO (US)

(72) Inventor: Todd Libsack, Greeley, CO (US)

(*) Notice: Subject to any disclaimer, the term of this patent is extended or adjusted under 35 U.S.C. 154(b) by 730 days.

(21) Appl. No.: 16/852,108

(22) Filed: Apr. 17, 2020

Related U.S. Application Data (60) Provisional application No. 62/835,958, filed on Apr. 18, 2019.

(51) Int. Cl.
*A01K 5/02* (2006.01)
*A01K 1/10* (2006.01)

(52) U.S. Cl.
CPC ................... *A01K 1/105* (2013.01)

(58) Field of Classification Search
CPC . A01K 1/10; A01K 1/105; A01K 5/01; A01K 5/0107; A01K 5/0291; A01K 5/0142; A01K 5/0225; A01K 5/023; A01K 5/025; B65D 43/16; B65D 43/163; B65D 43/164–169; B65D 90/54; B65D 90/008; B65F 1/16; B65F 1/1623; B65F 1/1638; A45C 11/36
USPC ................... 119/60, 61.1, 57, 57.1
See application file for complete search history.

(56) References Cited

U.S. PATENT DOCUMENTS

| | | | | |
|---|---|---|---|---|
| 5,248,057 A * | 9/1993 | Taylor | ................ | B65F 1/1623 220/908 |
| 5,363,805 A * | 11/1994 | Wing | ................ | A01K 5/0291 119/51.11 |
| 5,826,538 A * | 10/1998 | Roybal | ................ | A01K 5/0291 119/51.12 |
| 5,899,169 A * | 5/1999 | Jenson | ................ | A01K 5/0291 119/51.13 |
| 5,970,912 A * | 10/1999 | Supple | ................ | A01K 5/0291 119/51.11 |
| 7,083,060 B2 * | 8/2006 | Pickler | ................ | B65F 1/1607 220/601 |
| 8,220,414 B2 * | 7/2012 | Pitkaranta | ................ | A01K 5/01 119/61.3 |
| 8,360,268 B2 * | 1/2013 | Ullrich | ................ | A45C 11/36 206/214 |
| 2007/0181069 A1 | 8/2007 | Jack | | |
| 2010/0018467 A1 * | 1/2010 | Massicotte | ................ | A01K 5/0291 119/57.7 |
| 2018/0020638 A1 | 1/2018 | Blevins | | |

FOREIGN PATENT DOCUMENTS

FR            3026275 A1 *   4/2016   ............... A01K 1/10

* cited by examiner

*Primary Examiner* — Peter M Poon
*Assistant Examiner* — Danielle A Clerkley
(74) *Attorney, Agent, or Firm* — Reilly Intellectual Property Law Firm (57) ABSTRACT

A method and apparatus for storing and automatically feeding livestock having a guided pivoting panel member.

16 Claims, 12 Drawing Sheets

AUTOMATED LIVESTOCK FEEDER

FIELD

The present apparatus relates generally to a receptacle for storing and feeding hay to livestock. More specifically, the present apparatus stores and automatically feeds livestock.

BACKGROUND

In general, the feeding of livestock for small operations can be time consuming and can result in a waste of feed. In particular, the owners of livestock who are busy throughout the day may find it difficult to feed the livestock on a schedule. There is a need for an automated livestock feeder that provides a safe feeding environment for the livestock while allowing automated feeding. The present apparatus encloses and stores livestock feed protecting it from weather while regulating the livestock's feeding schedule. The unit has an electric actuator which is connected to a timer, relays and a power source. At predetermined times, the actuator opens and closes the encloser allowing livestock to eat. The unit can be refilled by opening the hinged gate located on the front of the unit to refill and clean the storage unit.

The objective of the present apparatus is to provide a worry-free experience to the owners of the livestock. The owners don't have to rush to feed the livestock because the unit can be operated automatically through the help of a software application. Moreover, the owner can fill the unit, set it up and leave it. Additionally, the unit is extremely convenient at the time of vacation, extreme weather conditions and weekends which allows the owner to have a flexible schedule. Furthermore, the unit keeps the area clean because this acts as a storage unit for the hay therefore no more messy piles of hay siting around. Also, the unit is mobile so it can be moved from one place to other and picked up using a forklift.

The unit is cost effective as it does not allow the livestock to over eat. The feed or hay that is pulled out is more likely to be cleaned up instead of trampled. The encloser or receptacle of the unit helps keep the feed dry and preserves the quality of the feed. The unit can also accommodate different sizes of hay which allows the user to purchase different sizes of hay depending on the market costs. Further, the receptacle for the feed is larger so that livestock may be automatically fed for longer periods of time. For example, hay bales come in different sizes, generally the larger bales are 3×3×8 and 4×4×8. One large bale of hay (3×3×8) could automatically feed one horse, 3 times per day for a time period of 35 to 45 days. Additionally, the unit keeps the livestock healthy by keeping them on a constant schedule. For example, horses have been shown to be healthier if they are fed more frequently during the day. This apparatus more closely simulates a horse's natural eating schedule than a manual feed, once or twice a day.

The present apparatus comes in a smaller form, having squared end, front and rear panels as well as a preferred larger rectangular receptacle. The unit also has a single sided opening as well as dual sided openings. The preferred embodiment is the rectangular, single-sided hay box while the second embodiment is the rectangular dual-sided hay box.

There is provided, a storage and automated feeding unit for livestock, the unit having a vile, at least one roof panel member, at least one loading gate member, at least one upper entry panel and a pair of opposite, generally squared end panels. The end panels are joined to opposite side edges of the vile, at least one loading gate member hingedly secured along a side edge to a side edge of at least one end panel, at least one upper entry panel pivotally secured at one outside edge to an outside edge of at least one roof panel member, a plurality of skid members secured to a lower exterior surface of the vile. At least one actuating means operatively engaged with at least one of the end panels and at least one roof panel member for automatically raising at least one roof panel member, and at least one actuating means electrically engaged with at least one timer, at least one relay and at least one power source.

There is also provided an interface between the roof panel member and the rear panel member or a channel member, forming an open plenum. The dual end panels also have interior arched side panels with guideways positioned on a lateral top portion of the side panels and the one roof panel member is mechanically engaged with the actuating member and adapted to be raised vertically. The lower gate member and the upper feeder panel are configured to cover at least one access entryway and the guideways are configured to guide a lower end of the upper feeder panel when in a lowered position. Further, upward movement of at least one roof panel member gravitationally forces the upper feeder panel to move downwardly and inwardly.

Finally, there is provided a method of automated feeding of livestock, the steps comprising transporting a storage feeder unit to a desired location, opening a lower gate and filling an interior of the feeder unit with livestock feed, closing the lower gate and latching a gate hitch member disposed on the lower gate, supplying at least one controller with a power source; the controller defined by a timer and relays; setting a schedule on the timer, activating at least one actuator, raising the roof member with the actuator, rotating the upper pivoting panel in an inward direction thereby providing access to the livestock feed within the interior of the feeder unit, lowering of the roof member by activating the actuator, rotating the upper pivoting panel in an outward direction thereby closing at least one opening to the interior of the feeder unit, and guiding a lower portion of the upper pivoting panel with the guideways for engagement with an upper portion of the lower gate.

BRIEF DESCRIPTION OF THE DRAWINGS

The accompanying drawings, which are incorporated and which constitute a part of the specification, illustrate at least one embodiment of the present device.

DETAILED DESCRIPTION

In reference to FIGS. 1-17, the present apparatus is an automatic feeder and storage unit for feed for livestock, particularly horses, but can be for other animals such as cattle that require regular feeding. More specifically, the apparatus comprises a squared or semi-rectangular receptacle or storage unit 11 that will protect and store feed and that is automated to open and gradually close to allow livestock to feed without injury. Moreover, the unit 11 can be programmed to open and close at designated times and intervals. The unit 11 and alternate forms are illustrated in FIGS. 1-16 and broadly comprise dual squared end panels 15 and 17 extending upwardly from a common base panel 19 and joined to a square or rectangular rear panel 21 which also extends upwardly from the rear edge of the base panel 19.

The end panels 15, 17 preferably are of sheet metal construction forming semi-squared panels having top, bottom, front and rear panels. The end panels 15 and 17 have opposite interior arch panels 20 that extend a substantial length and width of the side panels. The arch panels 20 include guideways 24 configured to provide a guide for a feeder panel 33 when descending into a lowered position. The rear panel 21 is of the same height as the end panels 15 and 17 and is joined together along its abutting edges or corners with the end panels 15 and 17 as well as the base panel 19 by well-known nesting seam construction or welding techniques. A front gate 25 is secured to one of the end panels 15 or 17 with hinge members 22, 14 and the feeder panel 33 is pivotally mounted to a roof panel 39 that is hingedly connected to the rear panel 21 or to channel 94 or 94" in a dual roof panel form to be discussed in more detail.

In this regard, the end panels 15 and 17, the rear panel 21, the front gate 25, the feeder panel 33 and the roof panel 39 are of sheet metal construction but other materials may be used. The preferred dimensions of the unit are 61"×46"×60" for a single opening squared unit, 117"×46"×60" for a rectangular single opening rectangular unit, 61"×50"×60" for a dual opening squared unit and 117"×46" 60" for a dual opening rectangular unit. The unit also has lower supports 42, 44, 46 and 48 secured to an exterior surface of the base panel 19 which serve as supporting structures for the unit 11 and allow for easy portability due to the rounded corners of the supports. Stake members 50 provide the ability to stake the unit to the ground or bolt the unit within cement to provide stability to the unit.

The front gate 25 is of square or rectangular configuration, as shown in FIGS. 1, 10, 12 and 13 with a length corresponding to that of the rear panel 21 but shorter in height than the rear panel 21. The front gate 25 has exterior edge metal piping 26 and is hingedly connected along one of side edges 27 or 29 to one of the corresponding side panels 15 or 17, with the opposite interior side having a lock member 31 or 31', preferably a latch gate, for engagement with the end panel 15 or 17 that is opposite the hinged connection for securing the front gate shut. In this form, the front gate 25 may have a left or a right-side gated opening depending upon the order specifications. The front gate 25 is designed to open outwardly to allow for easy access to the base panel 19 for easy placement of feed such as hay therein and easy cleaning of the receptacle or unit. The front gate has abutting edges with edges of the base panel 19 when in a closed position.

Figure 1:
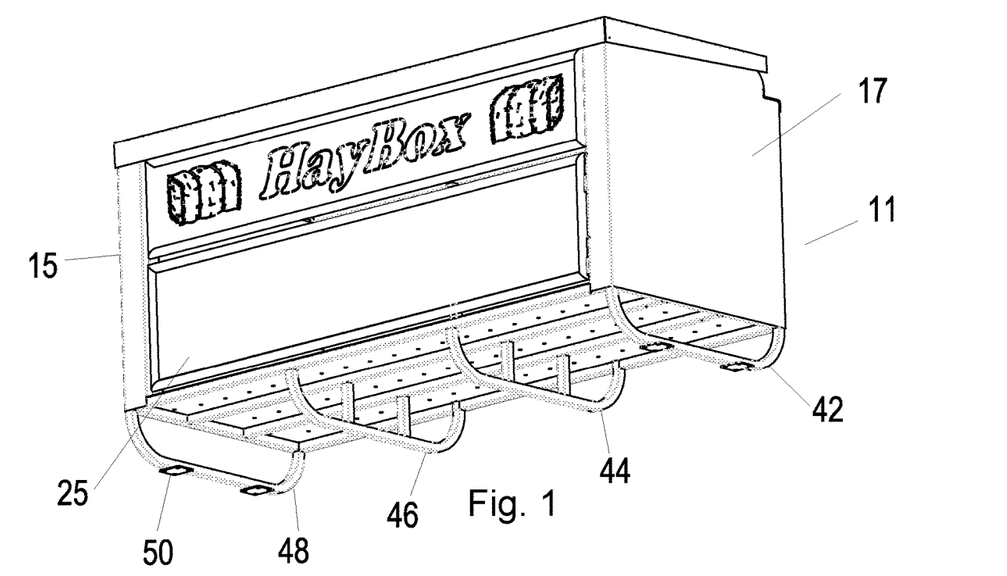
FIG. 1 is a top-front-right perspective view of the apparatus.
Figure 2:
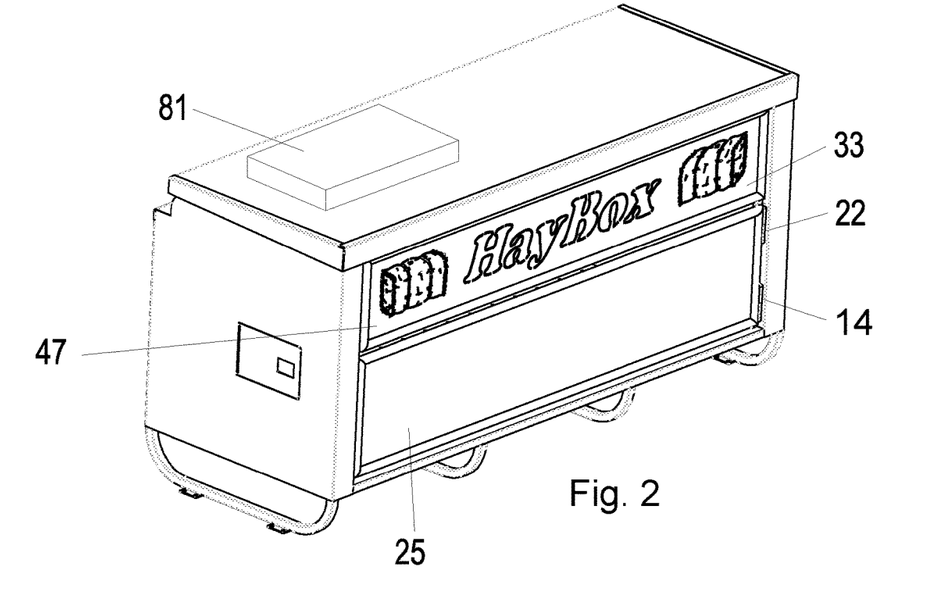
FIG. 2 is a top-front-left perspective view of the apparatus shown in FIG. 1.
Figure 3:
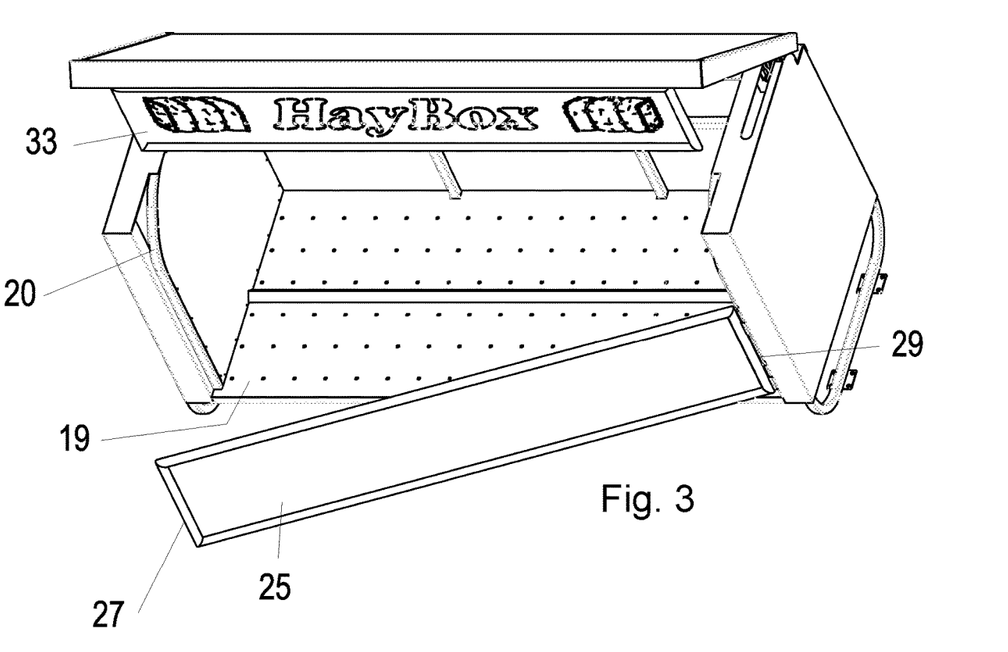
FIG. 3 is a bottom-front-right perspective view of FIG. 1.
Figures 4, 5:
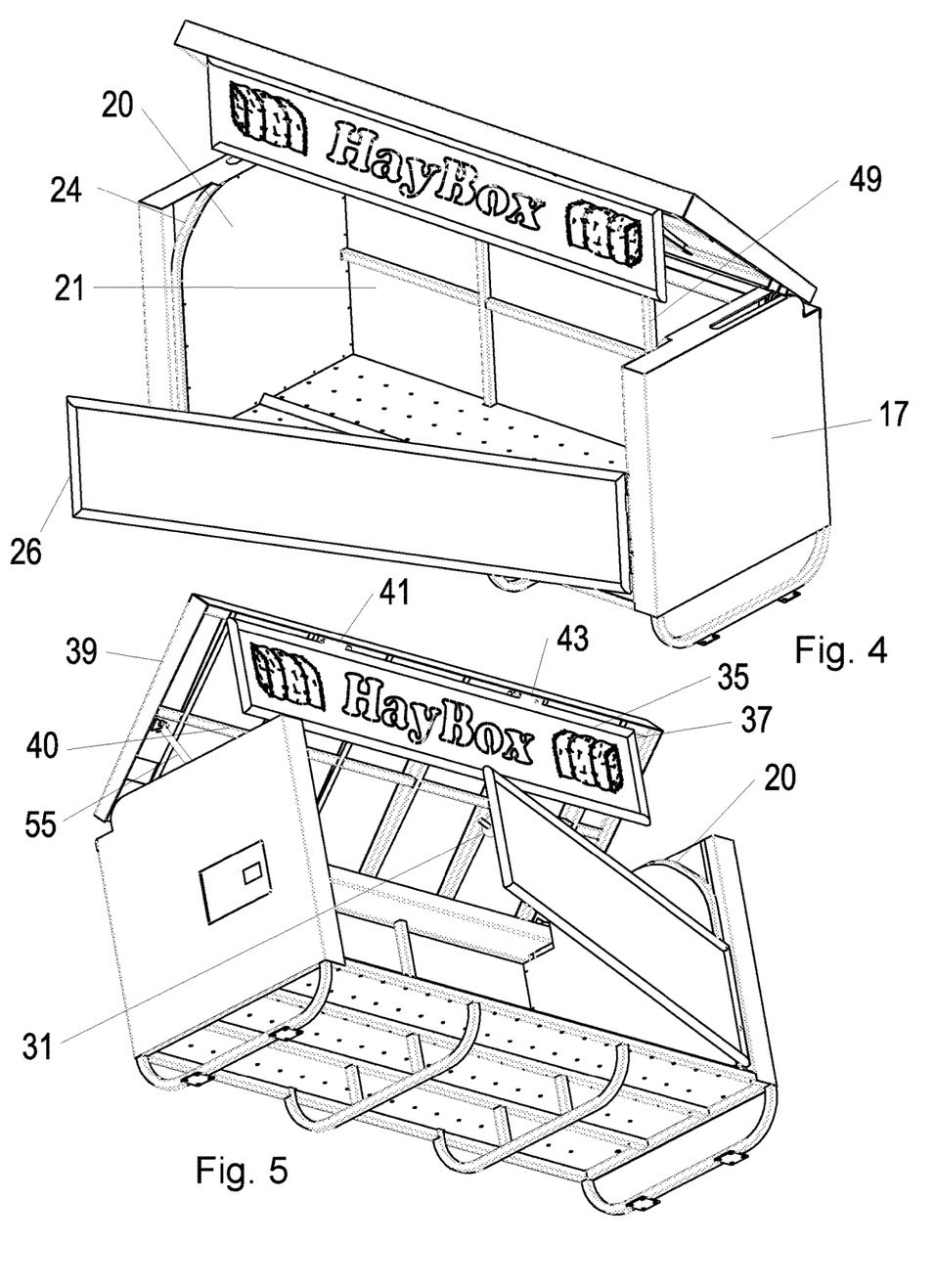
FIG. 4 is a bottom-front-left perspective view of FIG. 1.
FIG. 5 is a front bottom perspective view of FIG. 1.
Figure 6:
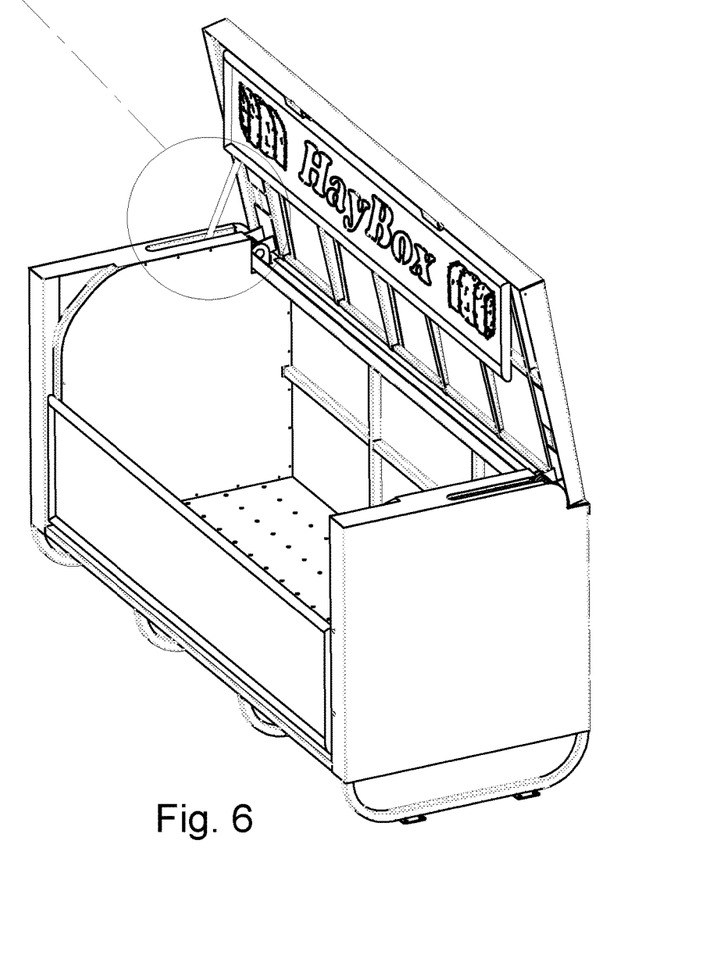
FIG. 6 is a top-front-right perspective view of FIG. 1.
Figure 6A:
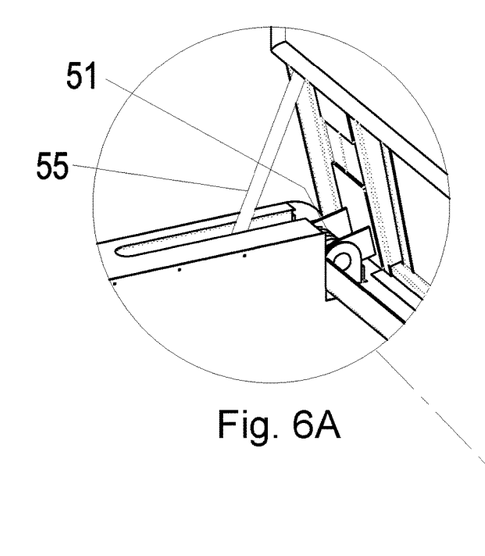
FIG. 6A is a cut-away view of FIG. 6.
Figure 7:
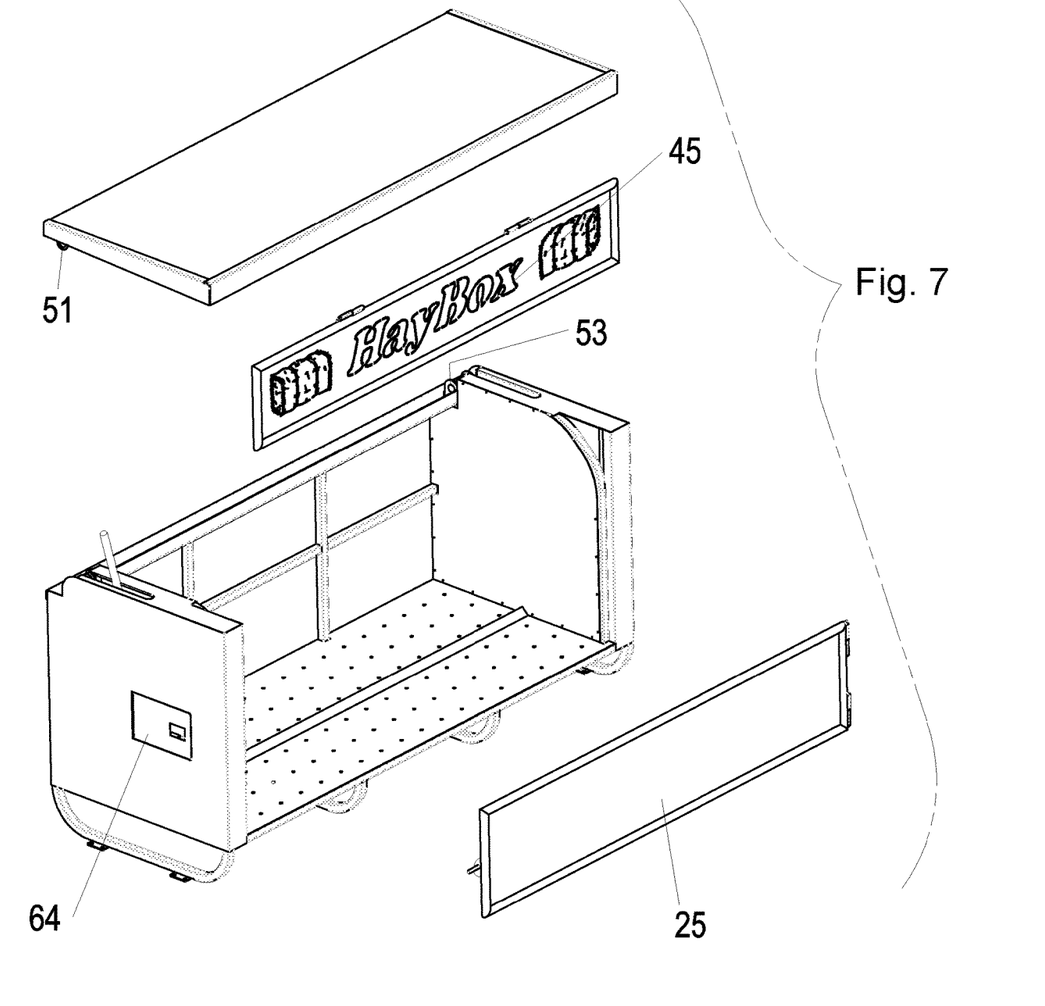
FIG. 7 is an exploded view of FIG. 1.
Figure 8:
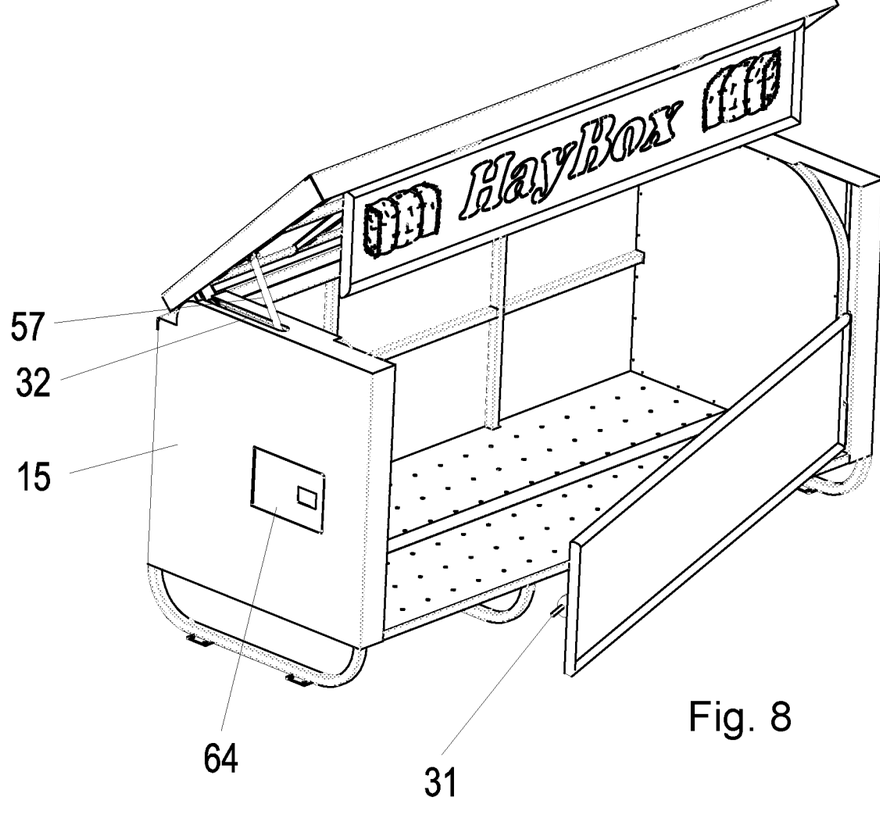
FIG. 8 is a bottom-front-left perspective view of FIG. 1.
Figure 9:
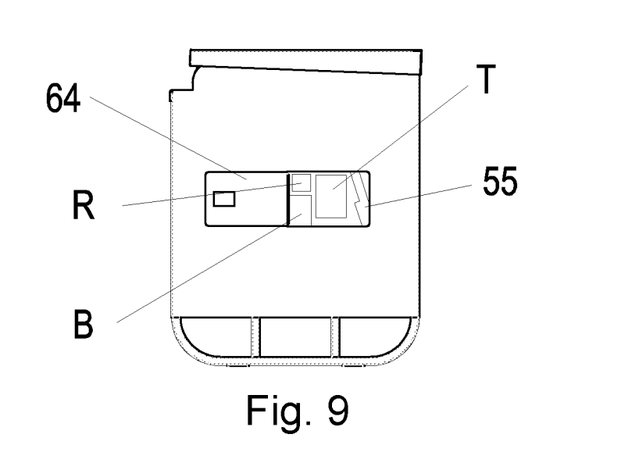
FIG. 9 is a side view of FIG. 1.
Figure 15:
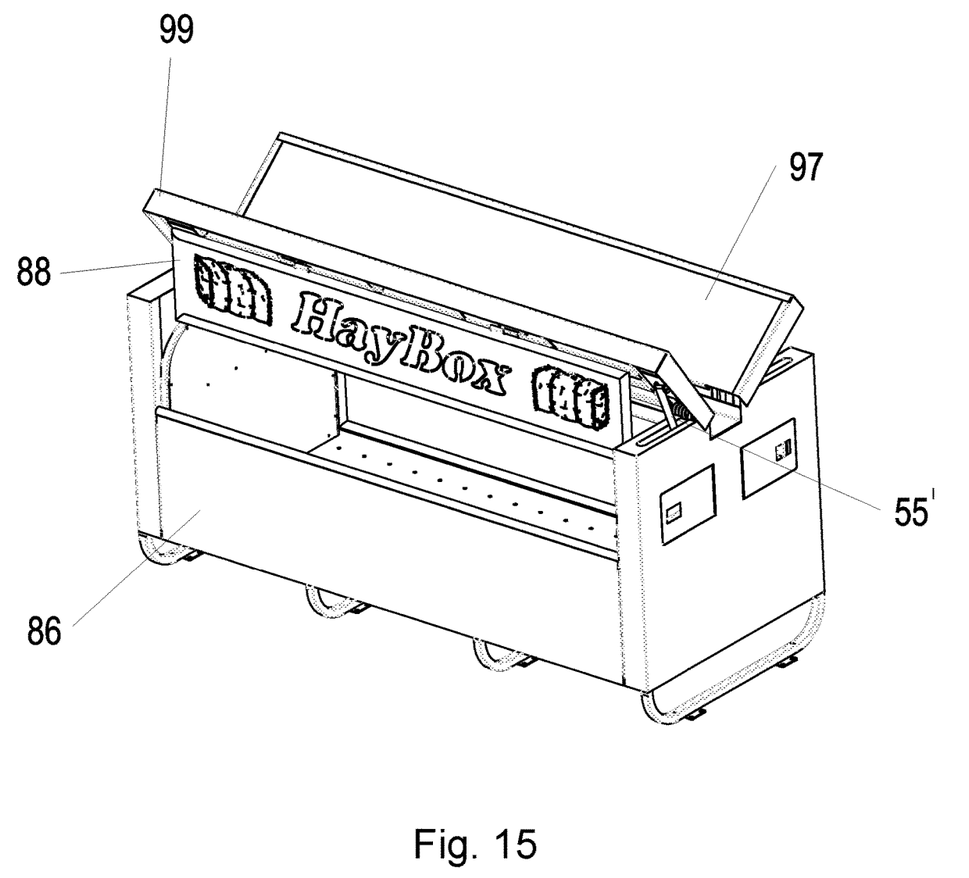
FIG. 15 is an alternate perspective view of FIG. 12.
Figure 16:
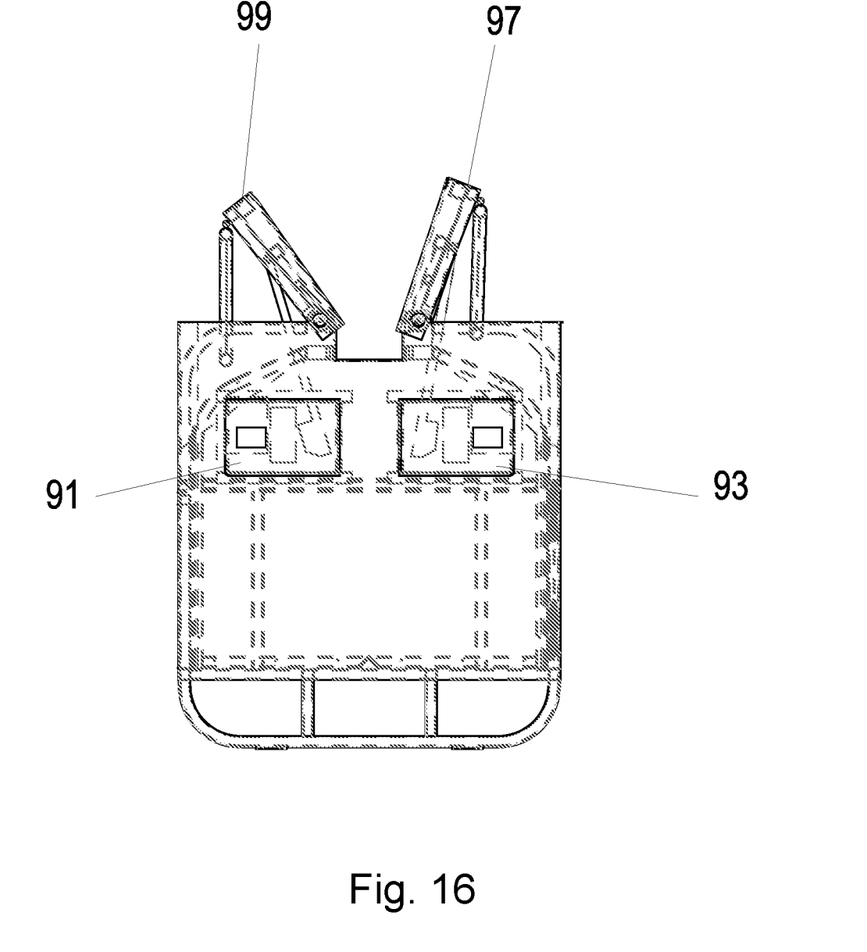
FIG. 16 is a side view of FIG. 12.

The feeder panel 33 is of corresponding length and height to that of the front gate 25 as shown in FIGS. 7, 10, 12 and 13 and variations may be present without departing from the scope of the disclosure. The feeder panel 33 is pivotally connected along its upper edges 35 to an upper edge 37 of the roof panel 39, preferably by means of pivot members 41 and 43. Other forms of connectors that allow for at least 90° of rotation of the feeder panel 33 may be used without departing from the scope of the disclosure. The feeder panel 33 has abutting edges with edges of the front gate when the unit is in a closed position. Once the roof panel begins opening, the feeder panel 33 gravitationally pivots downwardly so that when the roof panel is fully open, the feeder panel is configured to partially or completely engage with an inner surface of the roof panel as shown in FIGS. 6, 15 and 16. The feeder panel 33 preferably has spaced openings 45 passing through the feeder panel 33 to provide ventilation to the feed contained within the unit 11. The feeder panel 33 is dimensioned to cover the entrance or opening 47 above the front gate 25, the entrance 47 is dimensioned for entrance of the head of livestock therethrough. Generally, the entrance 47 is dimensioned to allow easy accessibility and accommodate multiple livestock at the same time.

The rear panel 21 includes structural supports 49 to maintain the integrity of the unit 11. The roof panel 39 has a corresponding length to that of the rear panel 21, the front gate 25 and the feeder panel 33 and a corresponding height to that of the end panels 15 and 17. The roof panel 39 also has reinforcing struts 40 that provide additional support to the roof panel 39 in case of a heavy weight, such as snow, on the upper surface of the roof panel. The roof panel also has a slight grade or pitch so that rain or snow will not tend to rest on the surface of the roof member. As referenced previously, the roof panel 39 is hingedly connected to the rear panel 21 with hinge members 51. An open plenum (not shown) exists between the roof panel 39 and the rear panel 21 to provide additional venting for the livestock feed.

Side panel box 64 is located along one of the end panels 15 or 17 for electronic housing. The panel box 64 is designed to house a controller that preferably includes, a timer T, relays R, battery B and a portion of the actuator 55. Generally, the panel is secured with a latch member (not shown). Referencing FIG. 9, there is shown the side panel box 64 with the enclosed controller components. The connectivity is part of the controller which allows the user to control the unit with the help of a software application such as a Wi-Fi connection or Bluetooth connectivity but can be any other type of connections as well. A camera (not shown) may also be used to view the unit remotely. The camera may be connected to the controller or wirelessly connected.

Referring to the actuator member or means 55, the mechanism may be any type of device that is operatively connected to the unit to allow for access to the feed. Specifically, the actuator member 55 is secured to a lower interior portion 57 of the roof panel 39 and is inserted within a side slot 32 of the end panel 15 such that the actuating member is configured to open and close the roof panel, allowing the feeder panel to be raised. Actuator member 55 can be any type of mechanical lift that is capable of lifting the roof member upwardly from the closed position. Preferably, an actuator such as the PA-09 or PA-17 from Progressive Automations may be used. The actuator member 55 is mounted using mounting brackets (not shown) to the panel and the roof member.

In operation, the actuator member 55 raises the roof panel such that the front gate is raised and allows free access to the feed by the livestock. The actuator may comprise an actuator arm that traverses through the side panel and upwardly forces the roof panel. The controller may be any unit or combination of units that facilitates control of the electrical and electronic components of the present apparatus. The timer T is preferably a 7 day/24-hour time switch, for example, by Intermatic, the relays R are standard off the shelf and the power source, including battery B is preferably a 12-volt, 35-amp battery which may be used with a trickle charger (not shown). The power source may be any source of electrical power, such as, but not limited to, battery B, a wired cable power connection, one or more solar panels 81, or one or more of the aforementioned power sources in combination.

In the preferred embodiment, the power source may utilize the solar panel 81 connected on an exterior surface of the roof panel member 39. The solar panel 81 is typically centered on the roof panel member but may be located anywhere on the roof panel without departing from the disclosure. The solar panel 81 converts the sun's energy into electrical energy to be used for the automation of the unit and is used with a solar controller, FIG. 17. The power source may further comprise a battery charged by the solar panel 81 for operation when sunlight is not available. In use, the battery B, trickle charger, FIG. 17, solar panel 81 and any other useful or necessary electronic components may be utilized for operating the electronic capabilities of the present apparatus. The timer T is electronically connected to the actuator mechanism 55, relays R and to the battery B. The battery B is electrically connected to a battery charger and wall outlet or the optional solar panel 82 and solar controller as shown in FIG. 17.

There are a number of ways in which an administrator can check the unit. In certain embodiments, the administrator can manually check the components and verify that the unit is running properly. In other embodiments, the administrator can remotely connect to the unit using RFID to verify that the unit is running properly and to program or re-program the feeding schedule. In certain embodiments, the unit can generate an error or warning message to the administrator if any hardware components have malfunctioned, allowing the administrator to remotely turn off or otherwise control the unit. In further embodiments, the administrator may remotely access the unit via a camera that is operatively connected to the unit or at least placed within viewing range of the unit.

A number of options are available for a user to access the application. It will be appreciated by those skilled in the art that an application refers to executable software for a computing device such as a laptop, personal computer and mobile phone. In one embodiment, the administrator may download the application to their computing device. It will also be appreciated that the administrator interfaces with the database through the software or a website loaded on a web browser. It will also be appreciated that an administrator can interact directly to access the unit. In certain embodiments, the unit has designated software that is connected to the internet and to a backend database or linked with the hardwired components within the unit, allowing the administrator to control the hardware components.

Figure 17:
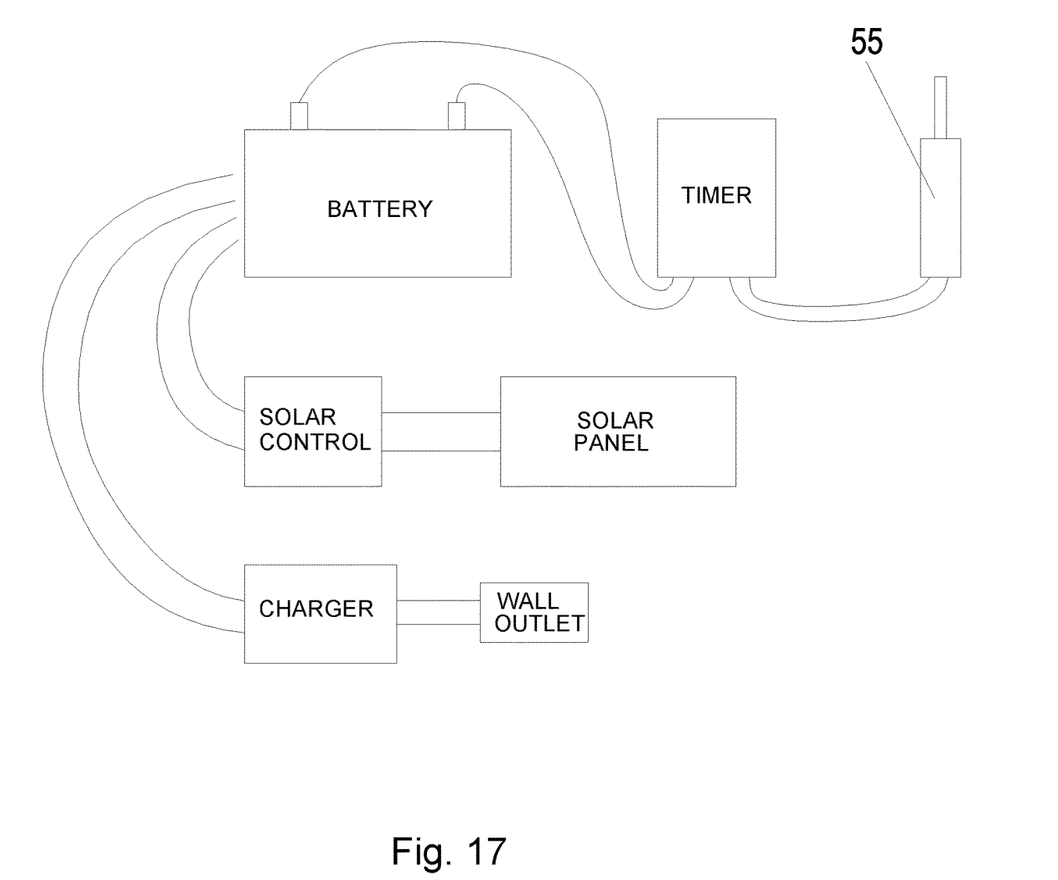
FIG. 17 is a circuit-diagram showing the controller system of the apparatus.

The executable software may also be stored in a computer readable medium that can direct a computer, other programmable data processing apparatus, or other devices to function in a particular manner, such that the instructions stored in the computer readable medium produce instructions which implement the function specified in FIG. 17. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions specified in FIG. 17.

Figure 10:
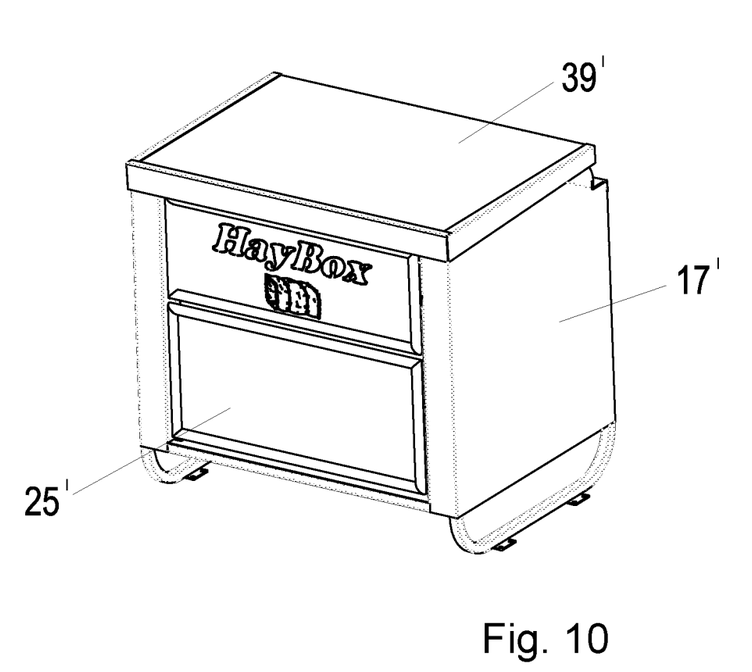
FIG. 10 is a front perspective view of a dimensionally smaller form of FIG. 1.
Figure 11:
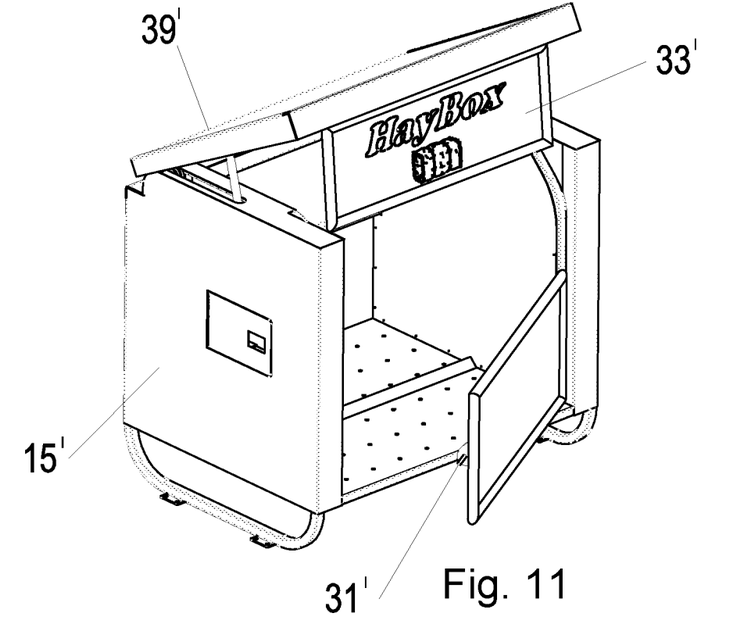
FIG. 11 is a side perspective view of FIG. 10.

FIGS. 10-11 show a variation of the first embodiment that is dimensionally different comprising squared front and rear panels. The front gate 25' is relatively squared and corresponds in length to the rear panel 21'. End panels 15' and 17', base panel 19', feeder gate 33' and roof panel 39' are aligned as in the above described form with all components functioning in the same manner as above. The smaller configuration of the unit 11 shown in FIGS. 10 and 11 is designed to hold a smaller quantity of feed and can be located in areas with limited space.

A second embodiment is shown in FIGS. 12-16 with like parts correspondingly enumerated having a dual sided storage unit and feeder where the livestock and feed from a front opening as well as a rear opening simultaneously. FIGS. 12-16 show variations of dual sided units comprising preferably a single compartment but may also have dual compartments without departing from the scope of the disclosure and adapted for livestock to access the feed along both sides. The dual sided units operate in the same way as the preferred form of the unit. The unit 11' broadly comprises dual squared end panels 15' and 17' extending upwardly from a common bottom panel or base panel 19' and joined to front gate members 86, 86' that also extend upwardly from the rear edge of the base panel 19'. The end panels 15', 17' each have dual interior arch frames 20' and guideways 24' configured to provide a guide for dual feeder panels 88 or 88' when descending into a lowered position.

Figure 12:
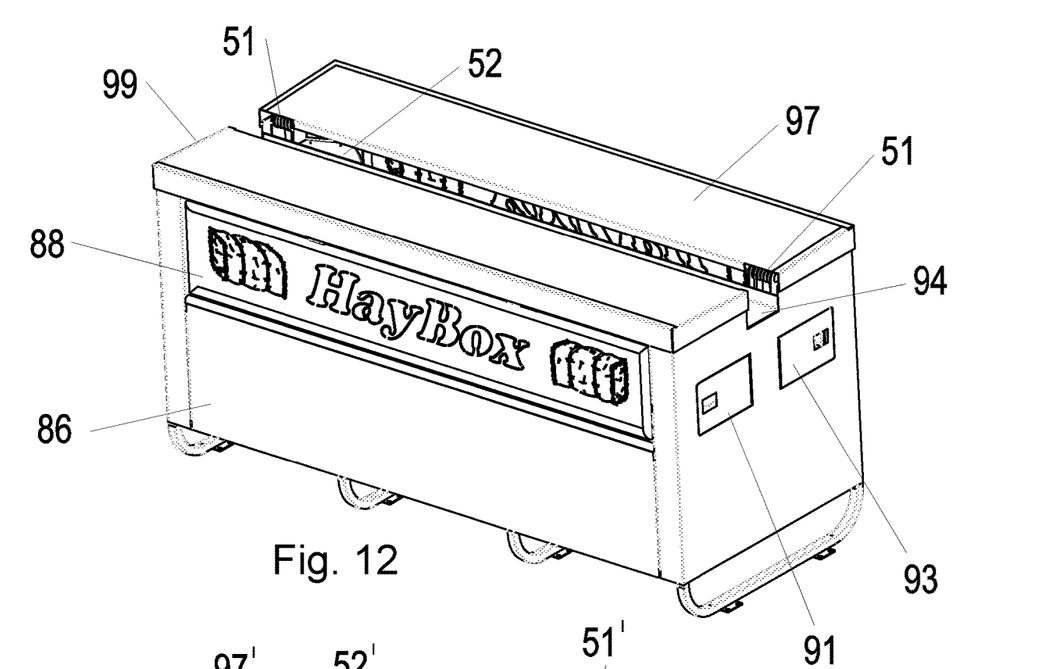
FIG. 12 is a front perspective view of a second embodiment.
Figure 13:
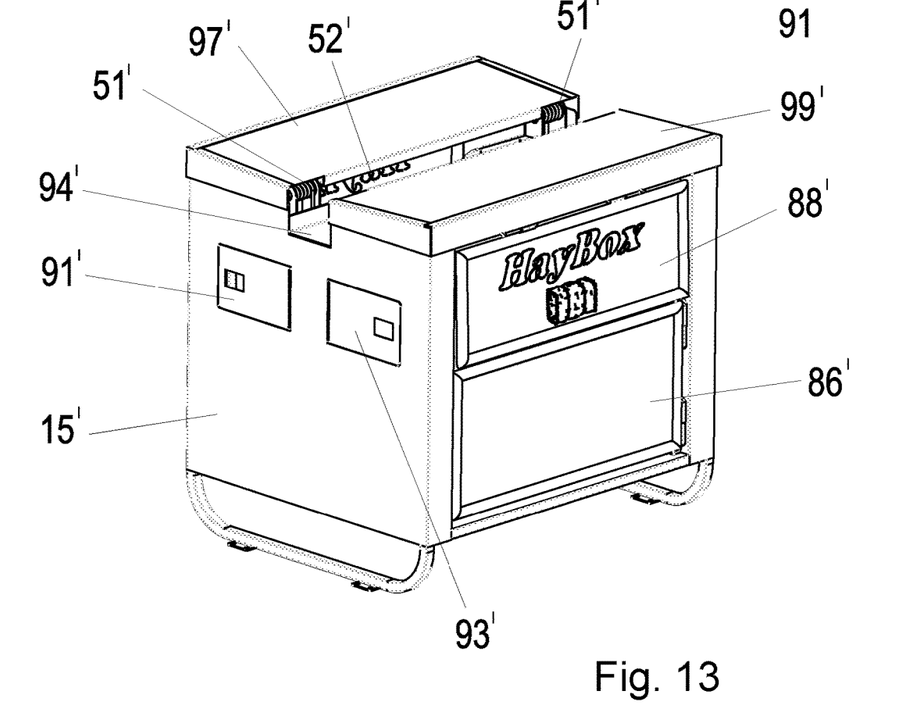
FIG. 13 is a side perspective view of a variation of FIG. 12.
Figure 14:
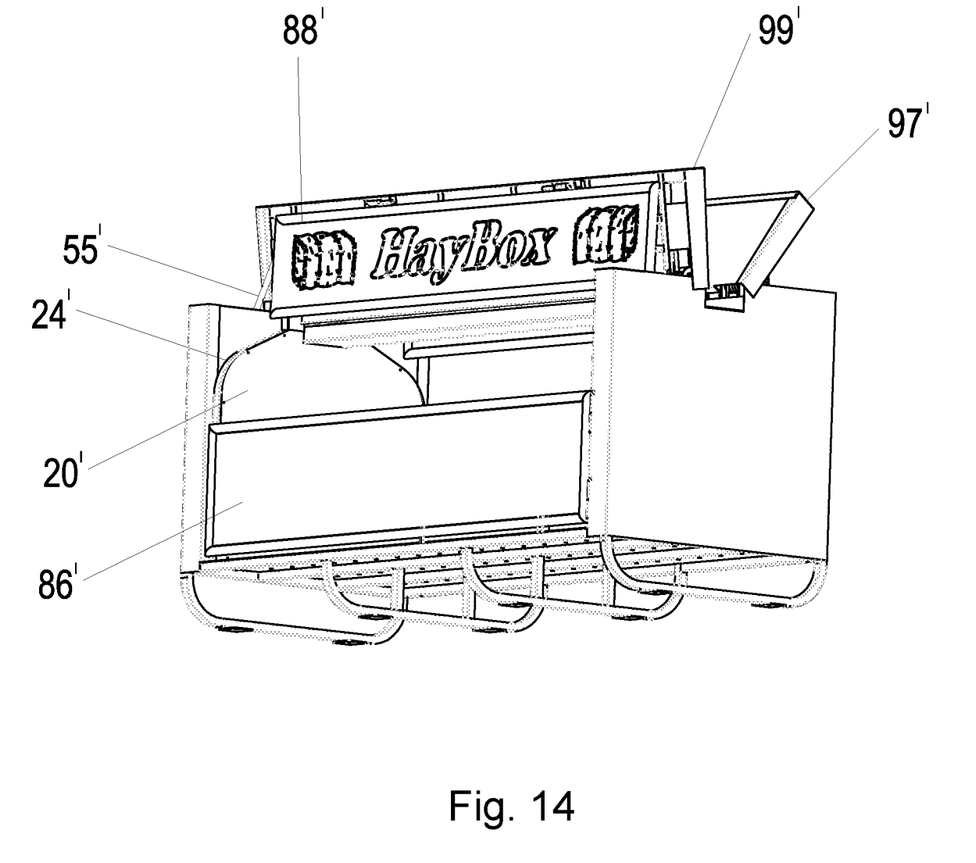
FIG. 14 is an alternate perspective view of FIG. 12.

The end panels 15' and 17' are joined together along abutting edges or corners with the base panel 19' by well-known nesting seam construction or welding techniques. The front gate 86 or 86' is secured to one of the end panels 15' or 17' with hinge members and the feeder panels 88 or 88' are pivotally mounted to the roof panels 97 and 99 or 97' and 99'. The roof panels are hingedly secured along a channel 94 or 94' as shown in FIGS. 12 and 13. An open plenum 52, 52' exists between the roof panels 97, 97', 99, 99' and the channel 94 or 94' to provide additional venting for the livestock feed.

Side panel boxes 91, 93 and 91', 93' are located along one of the end panels 15' or 17' for electronic housing. The panel boxes are designed to house a controller that preferably includes, a timer T, relays R, battery B and a portion of the actuator 55'.

In use, the unit as a single side dispenser or dual side dispenser, may be transported with a forklift or using the skid members 42, 44, 46, 48 to a designated location for feeding livestock. The stake members 50 may be used to secure the unit with stakes or bolts driven into cement. The unit as described above may be filled with livestock feed by unbolting the latch 31 on the gate member 25, 25', 86 or 86' and filling the interior of the unit with the desired amount of livestock feed. The gate member is then closed and secured with the latch 31. Power is supplied to the timer T through a battery source B or solar power. The timer is set to activate the actuator at desired times during the day. Once the schedule is set, the timer signals the actuator to activate. The actuator is secured at one end to at least one roof member 39, 39', 97, 97', 99, 99'.

Upon activation, the actuator forces the at least one roof member in an upward direction, gravitationally forcing the at least one upper pivoting panel 33, 33',88, 88' to rotate or pivot in an inward direction thereby providing access to the livestock feed within said interior of said feeder unit. The livestock will generally place their heads within the opening that has been created by the upward and inward pivoting of the pivoting panel. Once the scheduled feeding time is complete, the timer activates the actuator to begin lowering of the at least one roof member thereby gravitationally forcing the at least one pivoting panel in a downward direction. The downward pivoting of the at least one pivoting panel narrows the opening or access entryway to the feed in the unit, encouraging the livestock to remove their heads from the narrowed opening. The actuator causes the roof panel to descend slowly so that there is ample time for the livestock to remove their heads from the unit. Once a lower portion of the pivoting panel touches the guideways 24, 24', the pivoting panel is directed outwardly to prevent livestock from entrapment within the unit. The at least one pivoting panel closes the entryway once the at least one roof panel member is securely resting on the end panels.

While the present method and apparatus have been described in connection with the illustrated embodiments, it will be appreciated and understood that modifications may be made without departing, from the true spirit and scope.

I claim:

1. A storage and automated feeding unit for livestock, the improvement comprising:
    said storage and feeding unit having a base panel, at least one roof panel member, at least one loading gate member, at least one upper entry panel and a pair of opposite, generally squared end panels;
    said end panels joined to opposite side edges of said base panel;
    said at least one loading gate member having a side edge hingedly secured to a side edge of said at least one end panel of said end panels;
    said at least one upper entry panel having at least one outside edge pivotally secured to an outside edge of said at least one roof panel member;
    a plurality of skid members secured to a lower exterior surface of said base panel;
    at least one actuating means operatively engaged with said at least one end panel of said end panels and said at least one roof panel member for automatically raising said at least one roof panel member; and
    said at least one actuating means electrically engaged with at least one timer, at least one relay and at least one power source.

2. The apparatus according to claim 1 wherein said unit includes a rear panel member that is secured to said end panels and said base panel.

3. The apparatus according to claim 2 wherein said at least one roof panel member is hingedly engaged with said rear panel member.

4. The apparatus according to claim 3 wherein an interface between said roof panel member and said rear panel member forms an open plenum.

5. The apparatus according to claim 1 wherein said at least one roof panel member is hingedly engaged with a channel member.

6. The apparatus according to claim 5 wherein an interface between said at least one roof panel member and said channel member forms an open plenum.

7. The apparatus according to claim 1 wherein said end panels have at least one doorway and at least one door panel mounted on said at least one doorway for movement between an open and closed position with respect to said at least one doorway.

8. The apparatus according to claim 1 wherein said at least one timer, said at least one relay and at least one battery are housed within a panel box mounted within said at least one end panel of said end panels.

9. The apparatus according to claim 1 wherein said actuating means is controllable with a remote wireless application.

10. The apparatus according to claim 1 wherein said base panel has spaced perforations.

11. The apparatus according to claim 1 wherein at least one upper panel member has ventilation means.

12. An automated livestock feeding apparatus having dual end panels, at least one roof panel member, a base member, front and rear panels and an actuating member, the improvement comprising;
    said dual end panels having interior arched guideways disposed along an upper portion of said dual end panels for engagement with said at least one roof panel;
    said at least one roof panel member is mechanically engaged with said actuating member, wherein said actuating member raises said at least one roof panel member;
    said base member has spaced perforations; and
    at least one of said front and rear panels includes a lower gate member secured to one of said end panels and an upper feeder panel pivotally engaged with said at least one roof panel member and wherein said upper feeder panel engages with said arched guideways.

13. The automated livestock feeding apparatus according to claim 12 wherein said lower gate member and said upper feeder panel are configured to cover at least one access entryway.

14. The apparatus according to claim 12 wherein said interior arched guideways extend a substantial length and width of said side edge of said end panels.

15. The apparatus according to claim 12 wherein said guideways are configured to guide a lower end of said upper feeder panel when in a lowered position.

16. The apparatus according to claim 12 wherein upward movement of said at least one roof panel member gravitationally forces said upper feeder panel to move downwardly and inwardly.

* * * * *